(12) United States Patent
Soulier

(10) Patent No.: US 7,569,173 B2
(45) Date of Patent: Aug. 4, 2009

(54) METHOD AND DEVICE FOR TRANSFORMING CRYSTALLINE OR SEMICRYSTALLINE POLYMERS

(75) Inventor: Joël Soulier, Dreux (FR)

(73) Assignee: International Brain System S.A., Beaufays (BE)

( * ) Notice: Subject to any disclaimer, the term of this patent is extended or adjusted under 35 U.S.C. 154(b) by 767 days.

(21) Appl. No.: 11/066,391

(22) Filed: Feb. 28, 2005

(65) Prior Publication Data

US 2005/0225010 A1   Oct. 13, 2005

Related U.S. Application Data

(63) Continuation-in-part of application No. 10/200,454, filed on Jul. 23, 2002, now Pat. No. 6,875,394, which is a continuation-in-part of application No. PCT/BE01/00012, filed on Jan. 24, 2001.

(30) Foreign Application Priority Data

Jan. 24, 2000   (BE) ................................. 2000/0052
Oct. 27, 2004   (BE) ................................. 2004/0526

(51) Int. Cl.
    *H05B 6/00*   (2006.01)
(52) U.S. Cl. .................. 264/464; 264/405; 264/449; 264/472; 425/3; 425/200
(58) Field of Classification Search .................. 264/472, 264/474, 475, 402–405, 408, 412, 427, 429, 264/435–441, 449–453, 464–468, 486, 487; 425/3, 197–200, 206–207
See application file for complete search history.

(56) References Cited

U.S. PATENT DOCUMENTS

| | | | | |
|---|---|---|---|---|
| 3,321,391 A | * | 5/1967 | Warfield et al. | 204/165 |
| 3,943,614 A | | 3/1976 | Yoshikawa et al. | |
| 4,000,229 A | * | 12/1976 | Wainer | 264/437 |
| 4,174,907 A | | 11/1979 | Suh | |
| 4,683,093 A | | 7/1987 | Hagiwara et al. | |
| 4,778,635 A | * | 10/1988 | Hechtman et al. | 264/437 |
| 4,810,319 A | | 3/1989 | Isner | |
| 4,810,432 A | | 3/1989 | Kisler | |
| 5,254,297 A | | 10/1993 | Deeds | |
| 5,778,523 A | * | 7/1998 | Sylvester | 29/831 |
| 5,861,462 A | * | 1/1999 | Sasaki et al. | 525/64 |

FOREIGN PATENT DOCUMENTS

| | | |
|---|---|---|
| EP | 0 171 017 A2 | 2/1986 |
| EP | 1261469 | 3/2005 |
| FR | 2332797 A1 | 6/1977 |
| GB | 1086765 | 10/1967 |
| JP | 05200831 A * | 8/1993 |

OTHER PUBLICATIONS

Patent Abstracts of Japan, vol. 013, No. 335 (M-856), Jul. 27, 1989 & JP 012 113224 A (Canon Inc.) May 1, 1989.

* cited by examiner

*Primary Examiner*—Christina Johnson
*Assistant Examiner*—Magali P Thédore
(74) *Attorney, Agent, or Firm*—Sughrue Mion, PLLC

(57) ABSTRACT

A method for processing thermoplastics in a shaping device, whereby before and/or during its passage in the shaping device the thermoplastic is submitted to a static electrical field.

25 Claims, 9 Drawing Sheets

Polarization of dielectric domains
With a continuous electric field

Deformation of the bead under the
Action of an alternating electric field

POM (Tube 80 X 88)

PET COMPARISON ( 80 X 88 )

RECYCLED PEHD

POLYPROPYLENE ( Tube 8 X 12 )

METHOD AND DEVICE FOR TRANSFORMING CRYSTALLINE OR SEMICRYSTALLINE POLYMERS

The present application is a Continuation in part of U.S. Ser. No. 10/200,454 now U.S. Pat. No. 6,875,394, filed on Jul. 23, 2002 as a Continuation in part of International application No. PCT/BE01/00012, with an international filing date of Jan. 24, 2001, published in French under PCT Article 21(2) on Jul. 26, 2001 which claims the benefit of the priority of Belgian Patent Application BE2000/0052 filed on Jan. 24, 2000. The present Continuation in part claims the benefit of the priority of Belgian Patent Application BE2004/0526 filed on Oct. 27, 2004.

FIELD OF THE INVENTION

The object of the present invention is a method for treating thermoplastic materials, more particularly materials containing at least one crystalline or semi-crystalline polymer or copolymer having a melting point, a crystallization temperature and a glass transition temperature. The invention relates thus to a method for preparing a composition selected from the group consisting of polymer compositions, copolymer compositions and polymer-copolymer compositions from at least two different compounds selected from polymers and copolymers, as well as to a method for processing thermoplastic material.

THE STATE OF THE ART

Various injection processes of mixture of thermoplastic materials are known. In said processes, two or more thermoplastic materials or compounds are introduced in a mixing screw, wherein the thermoplastic materials are melted, before passing through the injection or extrusion head. The mixture of thermoplastic materials has properties depending from each thermoplastic material, as well as of the amount of each thermoplastic material present in the mixture. This mixture of materials is a simple physical mixing which is not suitable for achieving some exceptional properties.

Polymer processing, in particular the extrusion of solid or hollow profiles, is well known in the state of the art. Conventional devices such as vacuum tanks, extrusion dies, etc., are suited to thermoplastics that do not undergo sudden variations in viscosity, such as polyethylene, polyvinyl chloride, etc.

The known devices cannot be used with crystalline or semi-crystalline polymers such as polyethylene terephthalate (PET), because the very low viscosity phase is very rapidly followed by a gel phase, in other words there is too rapid a transition from a material that is too liquid to be introduced into a shaping fixture to a material that is too rigid to be shaped. On the other hand, the withdrawal of the shaping mandrel rod, for example in the case of a tube extrusion, gives rise to great friction which cannot be compensated by the thrust of an extruder screw.

DESCRIPTION OF THE INVENTION

The invention relates to a method or process for preparing a polymer or copolymer composition, in which said at least two different polymers/copolymers are mixed together in melted phase, whereby enabling to achieve a better mixture of the thermoplastic materials, and even possibly enabling some chemical reactions between the compounds (polymer/copolymer), such as transesterification reactions.

The invention relates thus to a method for preparing a composition selected from the group consisting of polymer compositions, copolymer compositions and polymer-copolymer compositions from at least two different compounds selected from polymers and copolymers, whereby said compounds have each a melting point, in which said at least two compounds are mixed in a melted state, so as to form a melted mixture of said at least two compounds, in which said melted mixture of said at least two compounds is contacted for a contact time with a structure selected from the group consisting of at least partly dielectric structures, at least partly magnetic structures and combinations thereof, said structure presenting passages for the melted mixture, whereby said passages have a cross section of less than 2 $mm^2$, advantageously less than 1 $mm^2$, preferably less than 500 $\mu m^2$, and in which, for at least a portion of said contact time of the melted mixture with said structure, the structure is submitted at least to a field selected from the group consisting of static electrical field, pulsed (such as alternating) electrical field, magnetic field and combinations thereof, whereby the electrical field is higher than 0.5 megavolts/meter, advantageously comprised between 0.5 and 10 Mega Volts/meter, preferably comprised between 2 and 7 Mega Volts/meter, while the magnetic field is higher than 0.5 Tesla, advantageously comprised between 0.5 and 10 Tesla, preferably comprised between 2 and 7 Tesla.

The passages or pores of the structure have a cross section measured in a plane perpendicular to the direction of flow of the melted mixture in the structure. Due to the small section of the pores or passages of the dielectric and/or magnetic structure, the mixture of melted materials or compounds passing through or in said pores or passages are submitted to important forces, in particular to very high striction forces or very high compression forces of the mixture on it self.

The structure is advantageously a multi element structure or a bead structure, i.e. a structure formed by a bed of beads. The structure has advantageously an open porosity (i.e. suitable for the flow of polymers/copolymers therein, or free volume suitable for receiving polymers/copolymers) comprised between 0.3 and 0.7 $cm^3$ per $cm^3$ of the structure, preferably comprised between 0.4 and 0.6 $cm^3$ per $cm^3$ of the structure. The structure is thus characterized by a filling rate of the distinct elements or beads comprised between 30% and 70% (the volume occupied by the beads corresponds to 30% to 70% of the total volume of the structure, said total volume being equal to the volume occupied by the beads+the volume of the interstices formed between the beads). The structure has also advantageously a specific surface comprised between 50 and 2000 $cm^2$ per $cm^3$ of structure, said surface being the surface which can be contacted by the melted polymer/copolymer mixture. Preferably said specific surface is comprised between 90 to 1000 $cm^2$ per $cm^3$ of structure, most preferably between 120 and 600 $cm^2$ per $cm^3$ of the structure. When using beads for forming the structure, the specific surface corresponds to the sum of the outer surfaces of the beads. For spherical beads with the same or substantially the same diameter, said surface is equal to $N \Pi D^2$ with N the number of beads and D the diameter of the beads.

The static and/or pulsed (such as alternating) electrical field is advantageously greater than 0.5 megavolts/meter, preferably between 0.5 and 10 megavolts/meter, most preferably between 2 and 7 megavolts/meter, while magnetic field (continuous or not, i.e. possibly alternating) is greater than 0.5 Tesla, advantageously comprised between 0.5 and 10 Tesla, most preferably between 2 and 7 Tesla. The electrical field is for example pulsed or alternating, especially sinusoidal or substantially sinusoidal with a frequency variable or not comprised between 1 KHz et 10 GigaHz, the power of the electrical field (continuous or not, pulsed or not, alternating or not) being advantageously comprised between 10 Watt and 10 KWatt. The pulse of the pulsed electrical field is for example substantially square and/or rectangular.

The frequency of the pulsed or alternating magnetic field is advantageously comprised between 5 and 40 kHz.

Preferably, for at least a portion of said contact time of the melted mixture with said structure, the structure is submitted simultaneously to a static field selected from the group consisting of static electrical field, static magnetic field and combinations thereof and to a pulsed (such as alternating) field selected from the group consisting of pulsed electrical field, pulsed magnetic field and combinations thereof.

The static electrical and/or magnetic field is intended to polarize the dielectric or magnetic parts of the structure, such as the particles consisting the structure (see FIG. 4A, polarization of the dielectric or magnetic parts of the particles by a continuous field), while the pulsed or sinusoidal electric and/or magnetic field is intended for exiting the structure, most preferably the particles or beads forming said structure, said particles or beads being selected from the group consisting of piezo-electric particles or beads, electrostrictive particles or beads and magneto strictive particles or beads. Electro strictive particles or beads are particles or beads which are subjected to a striction or a deformation when submitted to an electrical field. Magneto strictive particles or beads are particles or beads subjected to a deformation or a striction when submitted to a magnetic field.

Advantageously, the melted mixture of polymer(s) and/or copolymer(s) which has a melting point and a degradation temperature higher than said melting point, is pushed in passages of the structure at a temperature comprised between the melting point and the degradation temperature, preferably at a temperature comprised between 5° C. and 100° C. above the melting point, with the proviso that said temperature is below the degradation temperature.

Preferably, the structure is selected from the group consisting of at least partly piezoelectric structure, at least partly electrostrictive structure, at least partly magnetostrictive structure, and combinations thereof.

According to a detail of an advantageous embodiment, the structure comprises at least a portion adapted to be separated from at least a portion of the melted mixture after its contact with the structure submitted to at least one electric and/or magnetic field. In particular, the melted mixture is pushed in the passages of the portion of the structure adapted to be separated from at least a portion of the melted mixture. Most preferably, the structure is a structure adapted to be separated substantially completely from at least a portion of the melted mixture after its contact with the structure submitted to at least one field. According to a specific embodiment, the structure is a structure comprising a first portion adapted to be separated from a portion of the melted mixture, and a second portion adapted to remain at least partly in said portion of the melted structure. The second portion of the structure has advantageously a particle size lower than 10 µm, preferably lower than 5 µm, most preferably lower than 2 µm, most specifically lower than 1 µm.

According to a specific embodiment in which the melted mixture is contacting the structure under pressure, for at least a part of the contact time, the pressure is subjected to at least one variation.

According to another embodiment, the melted mixture is contacting the structure submitted to a magnetic and/or electrical field during a period of time at least sufficient for improving at least one characteristic selected from the group consisting of Young modulus, waterproof, gas proof, liquid proof, release rate, shock or impact resistance, aging, and combinations thereof.

According to another particularity of an embodiment, the melted mixture comprises at least a first compound selected from polymer and copolymers adapted to be present at least at 25° C. essentially in a first phase intended to form a matrix, and a second compound selected from polymers and copolymers, said second compound different from the first compound being adapted for forming at least at 25° C. essentially a second phase dispersed in the first phase.

The melted mixture comprises advantageously at least one liquid crystalline polymer.

In the method of the invention, the at least two different compounds present in the melted mixture are advantageously selected so as enable at least a partial transesterification between said at least two different compounds. When the mixture is suitable for forming at 25° C. a two phase system (matrix+microparticles dispersed in the matrix), transesterification bounds are advantageously made between the compound of the matrix and compound of the microparticles.

According to a specific embodiments, the melted mixture comprises at least a liquid crystalline polymer in an amount adapted to form at least at 25° C. a phase comprising particles with a size lower than 10 µm, advantageously lower than 5 µm, preferably lower than 2 µm, most preferably lower than 1 µm, dispersed in a matrix phase.

In the method of the invention, the used mixture is advantageously a thermoplastic mixture or a mixture suitable to form a thermoplastic matrix.

According to a specific method, the melted mixture is contacted successively with a structure selected from the group consisting of at least partly dielectric structures, at least partly magnetic structures and combinations thereof, said structure presenting passages for the melted mixture, whereby said passages have a cross section of less than 2 mm².

In said method, for at least a portion of said contact time of the melted mixture with said structure, the structure is submitted at least to a field selected from the group consisting of static electrical field, pulsed (such as alternating) electrical field, magnetic field and combinations thereof, whereby the electrical field is higher than 0.5 megavolts/meter, while the magnetic field is higher than 0.5 Tesla.

For example, the melted mixture is first contacted with a first structure, and then with another structure, the electric and/or magnetic field created in the first structure and in the second structure being advantageously different.

According to another possible embodiment, the melted mixture is recycled so as to flow twice or more in the structure.

According to a specific embodiment, the structure comprises beads selected from the group consisting of dielectric beads, magnetic beads and combinations thereof, said beads having a diameter comprised between 10 µm and 1000 µm, preferably between 20 and 500 µm, whereby said beads are placed in a chamber with a volume filling rate comprised between 30% and 70%. The filling rate is calculated with respect to the volume occupied by the beads, taking into account the volume defined between the beads.

According to another specific embodiment, the structure comprises a first fraction of beads selected from the group consisting of dielectric beads, magnetic beads and combinations thereof, said beads having a diameter comprised between 10 μm and 1000 μm, preferably comprised between 20 and 500 μm, and a second fraction of particles or beads selected from the group consisting of dielectric particles, magnetic particles and combinations thereof, said particles having an average weight diameter lower than 1 μm.

Advantageously, the weight ratio first fraction/second fraction is comprised between 1:2 and 50:1, preferably comprised between 1:1 and 20:1, most preferably between 3:1 and 10:1.

According to a specific embodiment, in which the mixture of said at least two compounds has at least a melting point and a solidification temperature, the mixture of said at least two compounds after contacting the structure is further processed in a process for shaping or giving a shape to the mixture. Such a shaping process is advantageously a process as disclosed here below, said process being another object of the invention.

Said process of the present invention is a process or method that makes it possible, inter alia, to extrude crystalline or semi-crystalline polymer, more particularly polyethylene terephthalate, but equally a method that makes it possible to more readily extrude thermoplastic materials such as polyethylene, polypropylene, PVC, polycarbonate, etc..

The shaping process or method according to the invention is especially applicable to the processing of crystalline or semi-crystalline polymer, preferably polymers or polymer mixes that present solid crystals below the crystallization temperature, advantageously presenting substantially only solid crystals below the crystallization temperature. In particular, the crystalline polymer or copolymer contains less than 40% by weight of non-crystalline or semi-crystalline polymer(s) or presenting liquid crystals below the crystallization temperature. More particularly, the crystalline or semi-crystalline polymer contains less than 20% by weight of liquid crystalline polymer and/or less than 20% by weight of polyolefin, in particular no or substantially no liquid crystalline polymers and polyolefins (for example less than 10% by weight of liquid crystalline polymer and less than 10% by weight of polyolefins). The liquid crystalline polymers are thermotropic polymers which present liquid crystals at a temperature lower than the crystallization temperature but higher than the hardening point.

The shaping process or method according to the invention is a method for processing thermoplastic materials presenting a melting point and a solidification temperature, wherein the thermoplastic material is heated to a temperature higher than the melting point, and wherein said heated material is processed in a forming device by lowering therein the temperature of the thermoplastic material from a temperature at least close to the melting point, to a temperature below the solidification temperature, said method being characterized by subjecting the thermoplastic material, before its passage in the forming device and/or during its passage in or through at least a part of the forming device, to a static electric field between a positive electrode and a negative electrode or earth, said electrodes or said electrode and earth being in contact with the thermoplastic material.

It is an advantage if, before and/or during its passage in the forming device, the thermoplastic material is subjected to a static electric field of at least 800,000 V/m, preferably at least 1,000,000 V/m, more particularly from 5,000,000 V/m to 20,000,000 V/m, between a positive electrode and a negative electrode in contact with the thermoplastic material.

The application time of the electric field over a zone of thermoplastic material may vary, for example, from a fraction of a second to a some seconds, or even several minutes. This application time may for example be between 0.5 and 45 seconds.

It is an advantage if, before and/or during its passage in the forming device, the thermoplastic material moves between a positive electrode and a negative electrode or earth in contact with the thermoplastic material, said field being substantially perpendicular to the flow of the thermoplastic material between the positive electrode and the negative electrode or earth.

An electrostriction and/or inverse piezoelectric effect is preferably created in the thermoplastic material between the positive electrode and the negative electrode or earth.

It is an advantage if the thermoplastic material is subjected to a substantially radial electric field whilst it is being formed, from a temperature of the material above or close to melting point, down to a temperature that corresponds to a solid state of the material.

According to one preferred embodiment, the shaping method according to the invention is a method involving processing a thermoplastic material that contains at least one crystalline or semi-crystalline polymer or copolymer having a melting point, a crystallization temperature lower than the melting point, and a glass transition temperature, said polymer or copolymer preferably presenting substantially only solid crystals below the crystallization temperature, in which the material is heated to a temperature higher than the melting point of the crystalline or semi-crystalline polymer or copolymer, and in which said heated material is processed in a forming device (such as shaping fixtures, moulds, dies and combinations thereof) by lowering therein the temperature of the material from a temperature higher than the crystallization temperature, to a temperature lower than the glass transition temperature of the crystalline or semi-crystalline polymer or copolymer.

The method presents the feature that the material is subjected to a static electric field, at least in respect of a temperature higher than the glass transition temperature, and preferably in respect of a temperature higher than the crystallization temperature (advantageously at least in respect of a temperature range higher than the glass transition temperature, and preferably in respect a temperature range higher than the crystallization temperature).

According to one practical embodiment of the method, the material is subjected to an electric field at least whilst the temperature is being lowered from a temperature higher than the crystallization temperature, to a temperature lying between the glass transition temperature and the crystallization temperature.

The electric field is in particular applied to create an electrostriction effect and/or inverse piezoelectric effect. The electrostriction effect is in particular produced at a temperature close to the crystallization temperature of the crystalline polymer or copolymer, whereas the inverse piezoelectric effect is produced at a temperature close to the glass transition temperature. These effects make it possible for the polymer to more easily flow and slide over the contact surface, notably over the surface of the electrodes in contact with the material.

Under one preferred form of embodiment, at least whilst the temperature is being lowered from a temperature higher than the crystallization temperature, to a temperature lying between the crystallization temperature and the glass transition temperature [in particular to a temperature close to the glass transition temperature (preferably lower than or roughly equal to the glass transition temperature), the material is subjected to a static electric field. It was observed that in addition to less resistance to friction, this improved the mechanical properties or characteristics of the product.

For example, the material is subjected to a static electric field over a temperature range that extends from a temperature higher than the crystallization temperature, down to a temperature at least 20° C. lower than the crystallization temperature, advantageously at least 50° C. lower than the crystallization temperature, and preferably at least 100° C. lower than the crystallization temperature.

According to one practical embodiment, at least in respect of a temperature close to melting point the material is subjected to a static electric field. This is an advantage because it was observed that at a constant throughput of material through a die, the pressure needed to force the material through the die was less in cases where an electric field was applied, for example at least halved with respect to the pressure needed when no electric field was applied.

According to one especially practical embodiment, the material is subjected to a static electric field at least in respect of a temperature close to melting point, as well as in respect of a temperature range extending between a first temperature higher than the crystallization temperature and a second temperature lying between the crystallization temperature and the glass transition temperature, preferably in respect of a range of temperatures extending from a temperature close to (in particular higher than) melting point, down to a temperature lower than the crystallization temperature, in particular close to the glass transition temperature.

According to a feature contained in one embodiment, the electric field has a strength of at least 800,000 volts/m, advantageously at least 1,000,000 volts/m, and preferably at least 2,000,000 volts/m, for example from 2,000,000 volts/m to 20,000,000 volts/m, more specifically from 5,000,000 V/m to 20,000,000 V/m, notably 5,000,000 V/m, 8,000,000 V/m and 10,000,000 V/m.

In the method according to the invention, the material is advantageously subjected to a radial and/or longitudinal and/or transverse electric field, but preferably at least radial or in a direction passing through the thickness of the material, more particularly in a direction substantially perpendicular to the direction in which the material flows in the die or the forming device.

According to one embodiment, the material is made to melt in an adiabatic or substantially adiabatic manner in the forming device.

According to one practical embodiment, a material containing at least one additive is processed so as to raise the dielectric characteristic, i.e. the dielectric constant or permittivity. This for example involves adding to the material a sufficient amount of additive to raise the dielectric constant or permittivity of the crystalline or semi-crystalline polymer or copolymer by at least 10%. Examples of suitable additives are titanium based compounds such as barium titanate, titanium dioxide ($TiO_2$), etc. The method according to the invention is particularly well suited to processing PET, possibly contaminated or containing additives or fillers, for example PET derived from PET preform or bottle manufacturing waste.

According to one detail of a method according to the invention, the forming device is a shaping fixture on an extruder or mould. The electric field may also be applied on a die, more particularly an extrusion die. The die or forming device advantageously has a mandrel rod designed to form the internal shape of the extrudate or extruded article and a wall designed to form the external shape or contour of the extrudate or extruded article. This mandrel rod is advantageously fixed or substantially fixed with respect to the die or shaping fixture. A radial electric field is therefore advantageously created between the mandrel rod and the wall designed to form the external shape of the extrudate or extruded article, the mandrel rod advantageously constituting a negative electrode or earth, whereas the wall advantageously constitutes a positive electrode.

The forming device of the shaping method according to the invention is advantageously a mould and/or a shaping fixture of an extruder, for example a shaping fixture operatively associated with a die for producing a profile, tube, etc. The forming device may also be a mould and/or die, or the injection runner or runners of a mould, so as for example to reduce the injection pressure and/or increase the number of cavities in the mould.

Another object of the invention is a product made from a crystalline or semi-crystalline polymer or copolymer (contaminated or otherwise) obtained by the shaping method according to the invention. It is an advantage if the product is made from PET, possibly contaminated or containing additives or fillers. It was observed that by inducing an axial static electric field, especially one that is radial with respect to a wall of the product, it was possible to enhance the mechanical characteristics of said wall.

Under one particular embodiment of the article according to the invention, the product is a bottle preform.

Still another object of the invention is a thermoplastic composition suitable to be prepared by the preparation method of the invention (first object of the invention), said thermoplastic composition comprising a thermoplastic matrix in which a liquid crystalline comprising phase is homogeneously dispersed in the form of elongate particles with a length of less than 10 µm, advantageously less than 5 µm, preferably less than 2 µm, most preferably less than 1 µm.

Advantageously, the elongate microparticles have a size distribution factor at 80% (preferably at 90%) of less than 0.9, advantageously less than 0.7, preferably less than 0.5.

The weight distribution factor at 80% is equal to $$[2(\phi 80\%-\phi 20\%)/(\phi 80\%+\phi 20\%)]$$

while the size distribution factor at 90% is equal to $$[2(\phi 90\%-\phi 10\%)/(\phi 90\%+\phi 10\%)]$$

In said formulae, $\phi xy\%$ is the maximum size of the particles of the particle fraction, the weight of which corresponds to xy % of the total weight of the particles.

Advantageously, the composition comprises from 0.01% by weight to 5% by weight of liquid crystalline polymer, preferably from 0.02 to 4% by weight, most preferably from 0.5 to 3.5% by weight.

According to a specific embodiment, the composition of the invention is mixed with another thermoplastic polymer or polymer composition, whereby the so prepared mixture has a content in the composition of the invention comprised between 0.01% and 99% by weight, preferably between 0.02% and 50% by weight, such as for example between 0.02 and 0.25% by weight.

According to an advantageous embodiment, the thermoplastic matrix comprises at least a compound suitable for making chemical bonds with particles or elongate particles of liquid crystalline polymer. Preferably, at least 10% by weight, most preferably at least 20% by weight, especially at least more than 50% by weight of the microparticles and elongate particles are at least partly bound chemically with the thermoplastic matrix, preferably by at least transesterification bounds.

According to a preferred embodiment, the composition has a Young modulus of more than 3 Giga Pascal and a shock or impact resistance of more than 150 J/m.

The invention relates also to a thermoformed element comprising at least partly a thermoplastic composition comprising a thermoplastic matrix in which a liquid crystalline comprising phase is homogeneously dispersed in the form of elongate particles with a length of less than 10 μm.

Yet another object of the present invention is a device for imparting a shape to a thermoplastic material under a method according to the invention. This device comprises:
- a die and/or shaping chamber which has a passage for introducing the material (for example at a temperature close to melting point, preferably higher than melting point, or at a temperature higher than the crystallization temperature or at a temperature lower than the crystallization temperature), said chamber or die having one or more walls in contact with the thermoplastic material (in order to shape it or give it an appropriate profile);
- a cooling means so as to cool one or more walls at least partially; and
- a means for connecting at least one wall or part-wall (part or portion of wall) of the chamber or die in contact with the thermoplastic wall to an electrical source in order to create a static electric field between at least said wall or part-wall (part of wall or portion of wall) and another wall or part-wall (part or portion of wall) of the chamber or die (walls or part-walls which are in contact with the thermoplastic material).

It is an advantage if the device includes a first means for connecting a first wall or part of wall (part-wall) to a pole (for example the positive pole) of an electrical source, and a second means for connecting another wall or part-wall to another pole (for example the negative pole) of the electrical source or to earth, such that the first wall or part of wall (part-wall) forms a positive electrode.

According to one possible embodiment, the device includes or is operatively associated with a means for creating a static electric field and a means having a positive electrode and a negative electrode or earth, said electrodes or earth being in contact with the thermoplastic material, said means creating between said electrodes or between the positive electrode(s) and earth a static electric field of at least 800,000 V/m, preferably at least 1,000,000 V/m (more particularly higher than 2,000,000 V/m, for instance from 5,000,000 V/m to 20,000,000 V/m).

The positive electrode and the negative electrode or earth preferably constitute walls of a channel in which the thermoplastic material moves in one direction, said electrodes or earth being arranged so as to create a static electric field substantially perpendicular to the direction in which the material flows in the channel.

According to a detail of one embodiment, the device has a die which is operatively associated with a shaping chamber, and means for connecting one or more walls of the die and of the shaping chamber to at least one electrical source, so as to create a static electric field in the die and a static electric field in the shaping chamber.

According to one practical embodiment, the forming device, advantageous operatively associated with a die, presents a defined channel between one wall of a positive electrode and one wall of a negative electrode or earth, said channel presenting a passage for introducing thermoplastic material that is molten (or close to melting point) into the channel. Substantially the entire surface of the wall(s) of the channel of the forming device (plus, if appropriate, that/those of the die) in contact with the thermoplastic material is constituted by electrode walls or by electrode walls and the earth. It is an advantage if the electrodes and/or earth are positioned or disposed so that an electric field is applied substantially radial throughout the forming device, as well as in the die if appropriate. Where the forming device presents a passage for the shaped material to exit (for instance at a temperature lower than the crystallization temperature, for example a temperature lying between the glass transition temperature and the crystallization temperature), the electrodes (or the electrode(s) and earth) are advantageously disposed or arranged so as to create a radial electric field in the material, substantially extending from the passage for introducing the material into the forming device, as far as the passage for the material to leave the forming device.

According to one practical embodiment, the wall or walls of the forming device or of the shaping fixture or of the mould and/or of the die in contact with the material are provided with aluminum oxide, notably being covered with a layer containing aluminum oxide.

According to one embodiment, the device has a mandrel rod designed to form the internal shape of the article formed in the shaping chamber, the latter presenting a wall designed to form the external shape of the article. The mandrel rod and the wall designed to form the external shape of the article constitute electrodes or an electrode and an earth for creating a radial electric field, the mandrel rod advantageously constituting a negative electrode or earth, whilst the wall advantageously constitutes a positive electrode.

It is an advantage if the device has a positive electrode and a negative electrode that are arranged so as to form between them an electric field and constituting walls of the shaping chamber in contact with the thermoplastic material, the positive electrode advantageously being made from an aluminum alloy, the contact face of the electrode with the thermoplastic material preferably being provided with a layer of aluminum oxide at least 25 μm thick.

According to one noteworthy feature, the walls of the forming device or of the shaping fixture and/or of the die in contact with the thermoplastic material are provided with aluminium oxide, more particularly being covered with a layer containing aluminium oxide.

According to one embodiment the shaping chamber is a mould.

It is an advantage if one or more insulating means extend between the positive electrode or the electrode connected to the positive pole of a current source, and the earth or negative electrode or the electrode connected to negative pole of a current source, an insulating means advantageously being formed by a layer of an insulating or dielectric fluid or liquid.

The device advantageously presents a chamber in contact with the positive electrode, containing the insulating fluid or liquid, and passages that communicate with said chamber, said passages being provided with a means of connecting the chamber to an insulating liquid or fluid circulating system, said system advantageously incorporating a cooling system.

According to a detail of one embodiment, the length of the positive electrode or positive electrodes in contact with the material—said length being calculated in the direction in which the material advances in the shaping chamber or die—is more than 5 cm, advantageously more than 10 cm, and preferably more than 20 cm. This length is for example somewhere between 20 cm and 2 m, or even more. The length of the positive electrode or positive electrodes will be determined in response to the zones in which an electric field is to be applied, in response to the throughput rate of the material, in response to the grade of articles being produced, to the size and thickness of the articles, etc..

The shaping device according to the invention is more particularly a device for shaping a material made of crystalline or semi-crystalline polymer or copolymer using a method according to the invention. The device comprises:

- a shaping chamber presenting a port for introducing the material at a temperature higher than the crystallization temperature, said chamber extending at least between a first wall or first part of wall and a second wall or second part of wall;
- a cooling means in order to cool at least one wall or part of wall of the chamber;
- if appropriate a die, the outlet of which communicates with the port for introducing material into the shaping chamber; and
- a means for creating a static electric field between at least one portion of the first wall or first part-wall and at least one portion of the second wall or second part of wall and/or in the die.

The device preferably has a die and means for creating an electric field in the die and in the shaping chamber.

It is an advantage if the shaping device according to the invention has a means for feeding the material into the shaping chamber adiabatically or substantially adiabatically (i.e. without heat exchange or transfer), at a temperature higher than the crystallization temperature.

The shaping chamber preferably presents an exit port through which the shaped material leaves at a temperature lower than the glass transition temperature. For example, the shaping chamber is an extrusion die, more particularly one for extruding a hollow profile, tube, conduit, sheath, etc.

According to possible forms of embodiment, the means for creating an electric field incorporates at least two electrodes disposed so as to create a radial and/or transverse and/or longitudinal electric field.

The means for creating an electric field preferably incorporates at least two electrodes disposed so as to create a radial electric field in the shaping chamber. According to one especially practical variant, the device furthermore incorporates at least two electrodes disposed so as to create a radial electric field in the die.

According to one preferred form of embodiment of the shaping device, the means for creating an electric field is arranged relative to the cooling means so as to create an electric field at least in one zone of the shaping chamber in which the material passes from a temperature higher than the crystallization temperature to a temperature substantially the same as the glass transition temperature.

According to another possible form of embodiment, the shaping device incorporates one or more means for creating an electric field at least in one zone of the die and at least in one zone of the shaping chamber, so as to apply an electric field to the material from a temperature higher than the melting point down to a temperature lower than the crystallization temperature, for example down to a temperature close to the glass temperature, or even lower than the glass temperature.

According to a detail of one embodiment, the shaping device has a mandrel rod designed to form the internal shape of the article formed in the shaping chamber, said chamber having one wall designed to form the external shape of the article. The mandrel rod and the wall designed to form the external shape of the article constitute electrodes for creating a radial electric field, the mandrel rod advantageously constituting a negative electrode or earth, whilst the wall advantageously constitutes a positive electrode.

According to another detail of one embodiment, the shaping device has a positive electrode and a negative electrode which are arranged so as to form an electric field between them and constituting walls of the shaping chamber in contact with the crystalline or semi-crystalline polymer or copolymer, the positive electrode advantageously being made from aluminum alloy, with the face that is in contact with the crystalline or semi-crystalline polymer or copolymer preferably being treated to receive a layer of aluminum oxide at least 25 µm thick.

The invention further relates to a device for preparing or treating a composition selected from the group consisting of polymer compositions, copolymer compositions and polymer-copolymer compositions from at least two different compounds selected from polymers and copolymers, whereby said compounds have each a melting point, in which said at least two compounds are mixed in a melted state, so as to form a melted mixture of said at least two compounds, in which said melted mixture of said at least two compounds is contacted for a contact time with a structure selected from the group consisting of at least partly dielectric structures, at least partly magnetic structures and combinations thereof, said structure presenting passages for the melted mixture, whereby said passages have a cross section of less than 2 mm$^2$, and in which, for at least a portion of said contact time of the melted mixture with said structure, the structure is submitted at least to a field selected from the group consisting of static electrical field, pulsed or alternating electrical field, magnetic field and combinations thereof, whereby the electrical field is higher than 0.5 megavolts/meter, advantageously from 0.5 to 10 megavolts/meter, preferably from 2 to 7 megavolt/meter, while the magnetic field is higher than 0.5 Tesla, said preparation device through which the melted mixture is flowing comprising:

- at least a means for associating the device to a system for conducting the melted mixture under pressure,
- beads selected from the group consisting of dielectric beads, magnetic beads and combination thereof, said beads having a diameter comprised between 10 µm and 1000 µm, preferably between 20 µm and 500 µm,
- an envelope defining an inner chamber containing said beads, said bead containing chamber extending between an inlet opening and an outlet opening, said chamber being provided with an open retaining means for retaining said beads in the chamber and preventing said beads to flow through the outlet opening during the flow of the melted mixture through the envelope, and
- a means for exiting at least a portion of said beads.

The preparation or treatment device further advantageously comprises particles selected from the group consisting of dielectric particles, magnetic particles and combinations thereof, said particles having a weight average particle size of less than 1 µm, whereby said particles are mixed to the beads.

According to a specific embodiment, the weight ratio beads with a diameter comprised between 10 µm and 1000 µm/particle with a weight average particle size of less than 1 µm is comprised between 1:2 and 50:1, preferably between 1:1 and 20:1, most preferably between 3:1 and 10:1.

The beads and/or particles are advantageously ceramic beads selected from the group consisting of piezoelectric beads, electrostrictive beads, magnetostrictive beads and combinations thereof.

Especially, the beads and/or particles are formed from a material selected from the group consisting of lead zirconium titanate, titanium dioxide, lead magnesium niobate, lead titanate, ferromagnetic alloy (such as alloy comprising nickel, iron and cobalt), ferrite (such as nickel-zinc) and mixtures thereof.

According to an embodiment, the preparation or treatment comprises at least one means for exiting at least a portion of said beads is selected from the group consisting of means for creating a static electrical field of at least 0.5 Mega volts/meter, preferably between 0.5 and 10 megavolt/meter, most preferably between 2 and 7 megavolt/meter, means for creating a pulsed or alternating electrical field of at least 0.5 Mega Volts/meter, preferably between 0.5 and 10 megavolt/meter, most preferably between 2 and 7 megavolt/meter, means for creating magnetic field of at least 0.5 Tesla, preferably between 0.5 and 10 Tesla, most preferably between 2 and 7 Tesla, and combinations thereof.

According to a specific embodiment, the preparation and/or treatment device further comprises a forming chamber in which the mixture is submitted to a constant electrical field, especially a shaping device of the invention.

Further noteworthy features and details of the invention will be apparent from the description of some exemplary embodiments. This description makes reference to the accompanying drawings.

DESCRIPTION OF PREFERRED EMBODIMENTS

Figure 1:
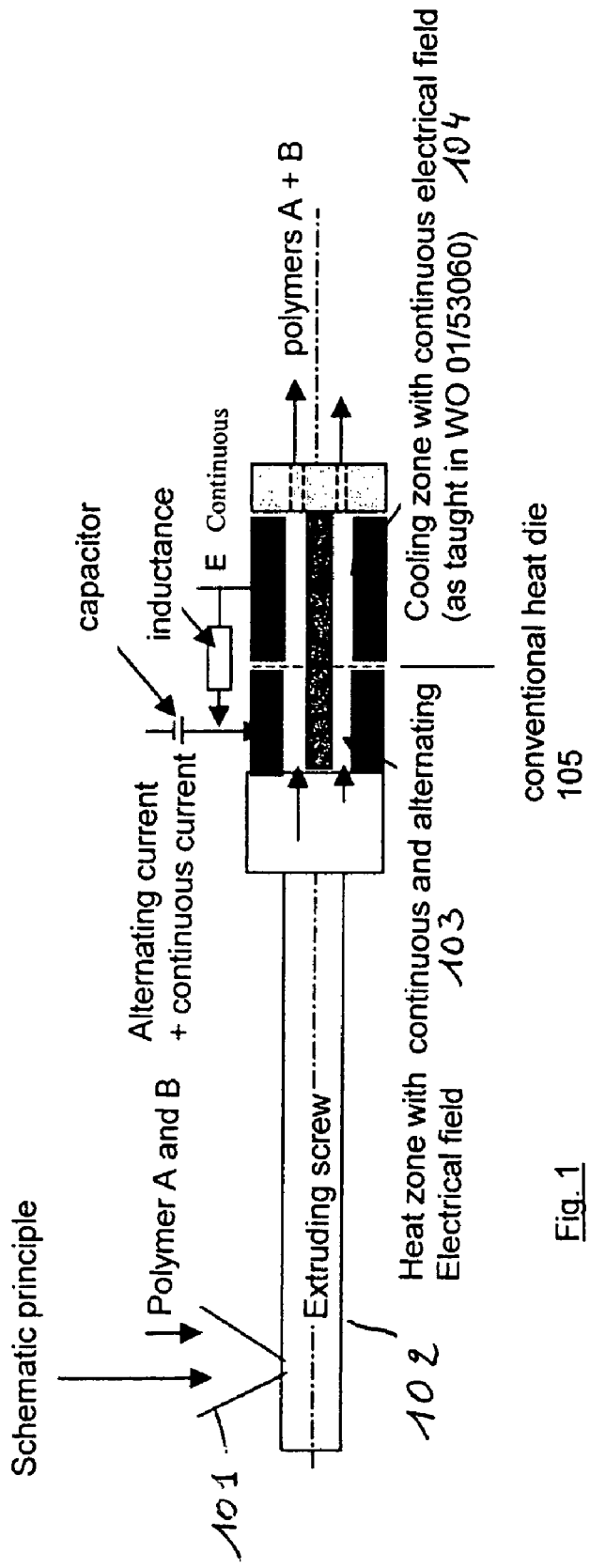
FIG. 1 is a schematic view of an installation or device suitable for carrying a preparation or treatment process of the invention.
Figure 2:
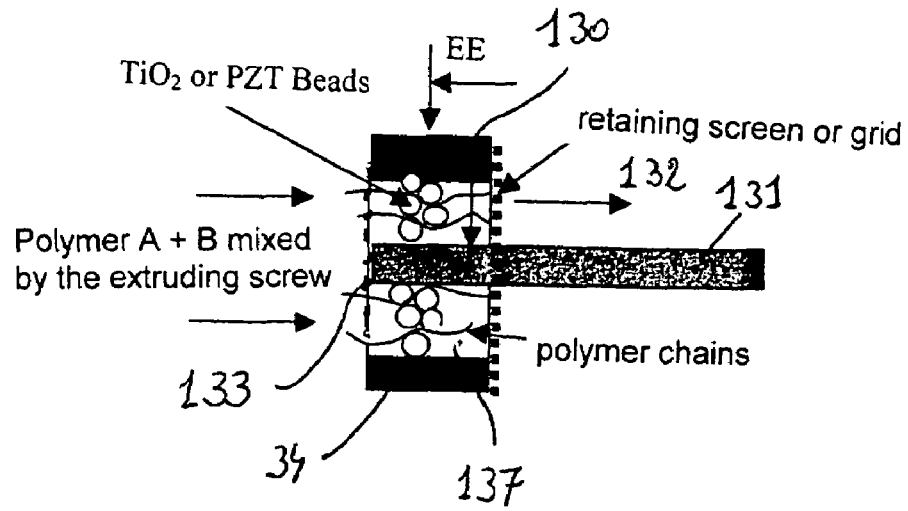
FIG. 2 is a schematic view of the preparation or treatment device of the installation.

The installation of FIG. 1 comprises

A feed hopper 101 of PET (polyethylene terephthalate) and liquid crystalline polymer, An extruder 102 with a driving screw for moving the polymer mixture, said extruder 102 comprising a mixing portion and a melting portion for melting the material, said melting portion heating the material at a temperature 10 to 15° C. higher than the melting temperature, the extruder pushing the melted material towards its end, A treatment device 103 for treating the melted material, A shaping means 104 for giving a shape to the material flowing out of the device 103, and A conventional heated die 105 intermediate to the treatment device 103 and the shaping means 104, the length of said conventional die portion being for example comprised between 5 and 100 cm.

The device 103 comprises an outer envelope 130, a central rod 131, an outlet retaining grid, screen or netting 132, an inlet retaining grid, screen or netting 133, and dielectric beads 134 located between the grids, screens or netting's 132, 133. The device 103 comprises a means for creating a static electrical field between the outer envelope 130 (forming the positive electrode) and the central rod 131 forming the negative electrode. By said means 136, an electrical field of 2 to 6 megavolt/meter is created. Advantageously the means 130 is also adapted for creating a pulsed or alternating electrical field with a frequency which can go up to 10 Giga hertz. The power of the device is for example variable between 0 Watt up to 10 kilo watt.

In the shown embodiment, the beads 134 are submitted to a pulsed or alternating electrical field and to a static electrical field (EE), the capacitor enabling to block the continuous current, while the inductance or self enables to block the alternating component of the current.

In the represented example, the beads 134 comprise a first fraction of beads 134A made in lead zirconate titanate (PZT) with a weight average diameter of about 150 µm, and a second fraction of beads 134B made of titanium dioxide with a weight average diameter of about 0.3 µm, the weight ratio first fraction/second fraction being 4. The filling rate of beads 134A,13B in the chamber 137 defined by the envelope 130 and the core 131 was about 60% (meaning that the volume of the voids defined between the beads 134A,134B is about 40% of the global volume in which the beads are located). The specific surface developed by the beads is about 200 cm$^2$ per cm$^3$.

The grids, screens or netting's 132 and 133 are advantageously such that they prevent the beads with larger diameter (lead zirconium titanate beads) to flow out of the device or to remain in the chamber 137. The smaller particles or beads are located and maintained between the larger beads. The grids, screens or netting's 132 and 133 are made of an insulating material or a material non conducting the electricity.

The shaping die 104 is a die able to submit the molted mixture to a continuous as disclosed in FIGS. 6 to 23. Such a die facilitates the flow of material during its cooling towards the outlet head or opening. According to a possible embodiment, a traditional die is used. The material when sufficiently cooled flows out of the outlet opening or head of the die.

Figure 3:
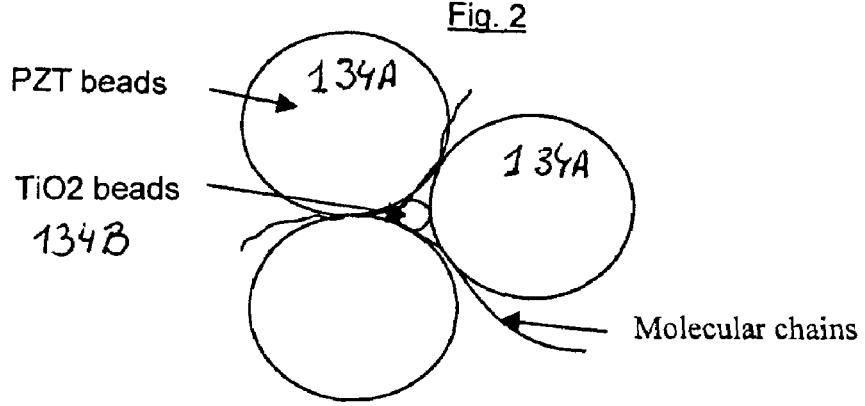
FIG. 3 is a larger view of beads of the device of FIG. 2.

FIG. 3 shows on larger scale some beads 134 of the device or means 103. The beads 134B are located in the voids formed between the larger beads 134A. This enables to reduce the free volume defined between the beads for the melted mixture to be treated. This enables also to submit the melted mixture to higher force, especially to higher contraction or striction of the molted material on its self. Such a contraction or striction enables to form chemical reaction between different molecules of the mixture, especially for creating bonds between molecules of the mixture, for example by transesterification. A path flow of molecules between beads is represented in said FIG. 3.

The flow time of the melted mixture in the device or the contact time of the molted material can be 100 seconds, or even more, but is advantageously less than 10 seconds. The length L of the device 103 is for example comprised between 5 and 100 cm.

The melted mixture is pushed in the device 103, for example at a pressure comprised between 5 $10^5$ Pa and 350 $10^5$ Pa. Due to the contraction or striction of the material on itself, the pressure drop in the device 103 is limited, said pressure drop being however function of the length of the device 103.

Under the action of the electrical field, the beads are deformed or compacted or compressed in the direction of the electrical field or elongated in a direction perpendicular to the electrical field.

In an embodiment similar to the embodiment of FIG. 1, the means 103 for creating a static electrical field has been replaced by a means for generating a static magnetic field (advantageously co-axial to the general flow direction of the material) with an induction comprised between 2 and 5 Tesla. The magnetic field can be pulsed or alternating with a frequency comprised between 5 and 40 kHz.

In still another embodiment, the installation comprises two distinct devices, namely a first device for submitting the melted mixture to a static, pulsed (such as alternating) or sinusoidal electrical field or to a static magnetic field, and a second for submitting the melted mixture treated by the first device to a static magnetic field.

Still in another embodiment, the installation comprises two different or distinct devices, namely a first device for submitting the melted mixture to a static, pulsed (such as alternating) or sinusoidal electrical field or to a static magnetic field, and a second device for submitting the melted mixture pretreated by the first device to a static magnetic field or to a static, pulsed or sinusoidal electrical field.

In said embodiments comprising two distinct devices, the devices are separated the one from the other by an intermediate element, in which the melted mixture is not submitted to an electrical or magnetic field generated by a device.

Figure 5:
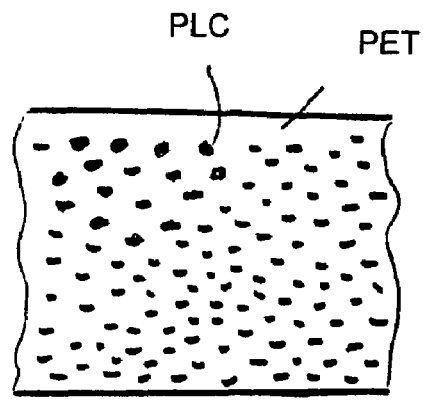
FIG. 5 is a cross section view on large scale of a composition according to the invention.

The installation of FIG. 1 has been used for extruding a profile in polyethylene terephthalate (PET) containing liquid crystal polymer (LCP). The mixture (mixture A) comprises about 1% by weight of LCP. FIG. 5 is a schematic cross section of mixture A after its treatment in the device 103 and after its cooling at ambient temperature. It appears from said FIG. 5 that the liquid crystal polymer (LCP) is substantially homogeneously distributed in the PET matrix. The LCP polymer is distributed in the form of small elongate particles oriented in the direction of field (i.e. substantially parallel to the direction of the electrical field), said elongate particles having a length of less than 1 µm, such as less than 0.5 µm, preferably from 0.1 µm up to 0.5 µm. The elongate particles have advantageously a size (length) distribution factor (in weight) at 90% of less than 0.5, meaning that substantially all the particles have substantially the same length corresponding substantially to the weight average length.

The Young modulus and the impact resistance were measured for the PET alone (not mixed with LCP), for the mixture PET+LCP not treated by the electrical field induced by the device 103, and for the mixture PET+LCP treated by an electrical field of 3.5 Mega volt/meter.

A mixture B has been prepared by mixing 5 parts in weight of mixture A with 95 parts in weight of polyethylene with a high molecular weight (such as from 50,000 to 250,000). The mixture B comprises thus 95% by weight polyethylene, 0.05% by weight LCP and 4.95% by weight PET. Said mixture has been treated and tested as described in the test made for mixture A.

The results of said tests are given in the following table

|  | Young Modulus Giga Pa | Impact resistance J/m |
|---|---|---|
| PET only | 0.5 | 30 |
| Mixture A Not treated | 1.2 | 100 |
| Mixture A treated | 4.5 | 200 |
| Polyethylene High density (not mixed) | 0.3 | 900 |
| Mixture B Not treated | 0.8 | 800 |
| Mixture B treated | 3.5 | 600 |

This example has been repeated with other compositions, namely those listed in the following table:

| Composition % by weight | PET | LCP | PE | Talc | montmorillonite |
|---|---|---|---|---|---|
| A1 | 97 | 3 | | | |
| A2 | 99.4 | 0.6 | | | |
| A3 | 94 | 1 | | 5 | 5 |
| A4 | 94 | 1 | | | 5.1 |
| A5 | 90 | 0.9 | | 5 | 10 |
| A6 | 80 | 2 | | 8 | 18 |
| A7 | 80 | 2 | | | |
| B1 | 9.9 | 0.1 | 90 | | |
| B2 | 18.8 | 0.2 | 80 | | |
| B3 | 9.9 | 0.1 | 80 | | 10 |
| B4 | 9.9 | 0.1 | 80 | 5 | 5 |
| B5 | 9.9 | 0.1 | 70 | 5 | 15 |
| B6 | 4.9 | 0.1 | 80 | 5 | 10 |
| B7 | 4.9 | 0.1 | 80 | | 15 |

In said examples, other additives or charges can be added, said additives or charges being preferably component modifying at the nanometric scale, such as for example clays (for example montmorillonite), carbonates (for example calcium carbonate), talc, etc., said additives being for example present in the composition at a rate of 1 to 20% by weight.

The example has been repeated with other thermoplastic mixtures, namely mixtures based on polycarbonate, PVC, polypropylene, thermoplastic elastomers, such as thermoplastic butadiene elastomer, thermoplastic EPDM, thermoplastic nitrile elastomer, etc. and combinations thereof.

Figure 4A:
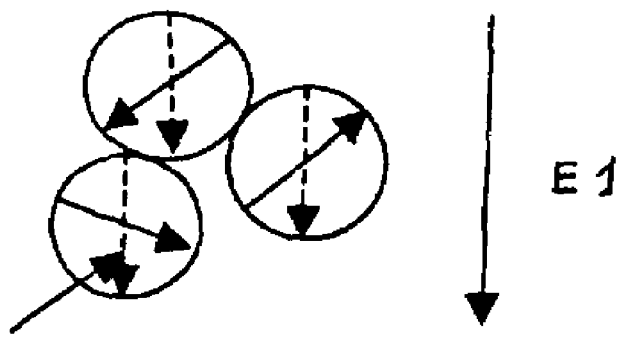
FIGS. 4A and 4B are schematic views of beads submitted respectively to a static electrical field (FIG. 4A) and to a pulsed or alternating electrical field with deformation of the bead (FIG. 4B)
Figure 4B:
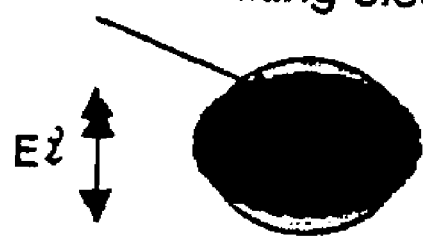

FIGS. 4A and 4B are schematic views of beads submitted respectively to a static electrical field E1 (FIG. 4A) inducing the polarization of dielectric domains of the beads 134 and to a pulsed or alternating electrical field E2 with deformation of the bead (FIG. 4B)

Figure 6:
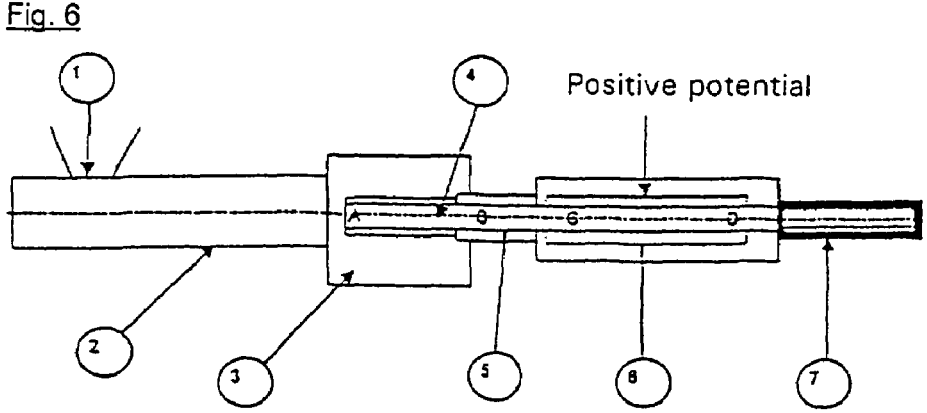
FIG. 6 is a schematic view of an extruder equipped with a device according to the invention.

FIG. 6 shows an extruder 2 receiving crystalline or semi-crystalline polymer (for example PET in the form of granules or slivers) through the feed hopper 1. The polymer is melted in the extruder 2 and is forced into the head 3, which in zone A thereof is equipped with a mandrel rod 4 designed to produce the internal shape of the extrudate. The extrudate then passes into an adiabatic zone B (zone 5 where there is no, or substantially no, heat exchange). It is an advantage if this zone is convergent, i.e. if the throughput section of said zone decreases in the direction in which the material advances. The temperature of the polymer in this zone 5 is slightly higher than the crystallization peak, for example a temperature 1° to 20° C. higher than the crystallization peak. Next the melted polymer passes into zone C, which is subjected to strong cooling and to a strong electric field. Zone C thus constitutes a condenser 6. This electric field is maintained until the temperature of the polymer is the same or less than the glass transition temperature of the polymer (zone D). The stabilized product 7 accordingly exits from the extrusion die.

Figure 7:
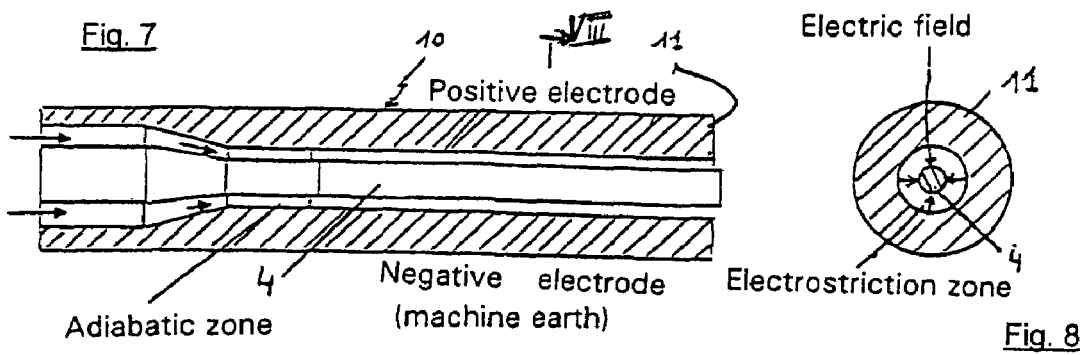
FIG. 7 is a sectional view of a detail of the extrusion die from FIG. 6.

FIG. 7 is a sectional view of the extrusion die, extended by a forming device. The unit comprising the die/forming device 10 has an envelope 11 incorporating a passage along which extends the mandrel rod 4. The mandrel rod 4 forms a negative electrode or the machine's earth, whereas the envelope 11 forms the positive electrode. The electric field thereby created is a radial field directed towards the mandrel rod 4. This radial electric field (see FIG. 3) induces an electrostriction phenomenon in the crystallites, which manifests itself in a slight detachment of the polymer relative to the positive electrode (the temperature of the polymer being lower than the crystallization temperature or peak). The inside face of the envelope 11 is for example made from aluminum alloy, advantageously treated and coated with a layer of aluminum oxide $Al_2O_3$. This slight detachment makes it possible for the product to move in the extrusion die by the force of the extruder screw and enables the product to exit from the extrusion die. In the present case the electric field between the electrodes was a field of 5,000,000 V/m. The material for instance enters the unit 10 at a temperature higher than the melting point and exits at a temperature lower than the crystallization temperature.

The positive electrode 11 is insulated from the earth (for example by electric insulation pads) and is operatively associated with one or more cooling ducts.

During its passage or flow in the unit 10 (from its entry up to its outlet in the case of FIG. 7, i.e. its complete passage or flow in the unit 10), the thermoplastic material is submitted to a static radial electrical field.

The cooling of the unit 10 (extrusion die and/or forming device) is for example realized by means of an electrical insulating fluid with a high calorific value, more particularly by means of a dielectric oil.

One possibility would have been to use low-temperature gas circulation, for example employing nitrogen, to carry out said cooling.

This insulating fluid therefore also serves as an electrical insulator for the positive electrode. This insulation is for example useful if the channels in which the fluid is flowing are formed between the positive electrode and an earth, but is likewise useful for insulating the positive electrode from the insulating fluid circulation system or cooling system.

In the case of FIG. 6, the product leaving the extrusion die is a tube with an external diameter of 9 cm and a wall 0.5 cm thick.

Figure 8:
FIG. 8 is a transverse sectional view (along the line VIII-VIII) through the extrusion die of FIG. 7.
Figure 9:
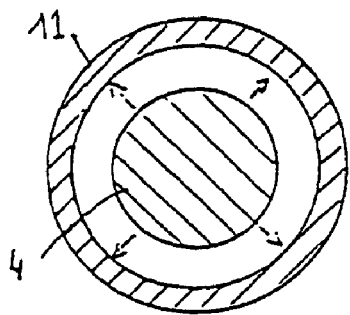
FIGS. 9 to 12 are views showing the positioning of the electrodes so as to obtain a particular field.

FIG. 9 represents a cross-section taken through an extrusion die similar to the one in FIG. 8, except for the fact that the mandrel rod constitutes the positive electrode and the envelope 11 constitutes the negative elect rode.

Figure 10:
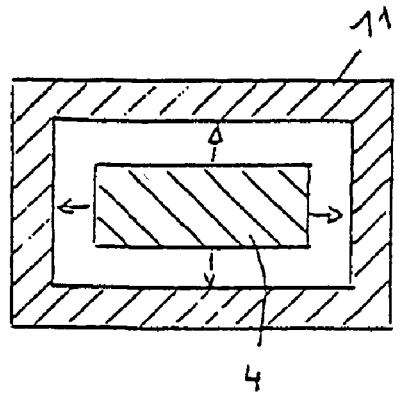

FIG. 10 represents a cross-section taken through a die for extruding a hollow profile of rectangular cross-section. In this embodiment the mandrel rod of rectangular cross-section constitutes the positive electrode, while the envelope 11 constitutes the negative electrode.

Figure 11:
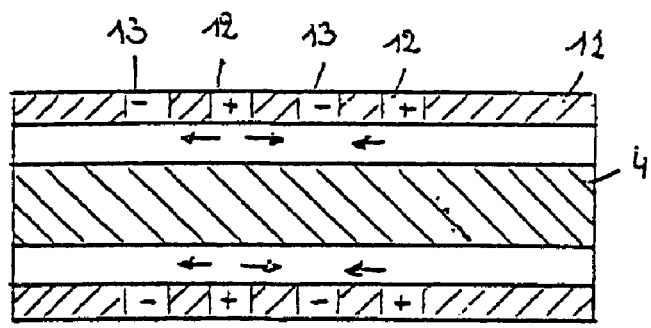

FIG. 11 schematically represents a longitudinal section taken through an extrusion die, the envelope 11 of which has a series of distinct elements 12; 13 which form positive electrodes and negative electrodes, a positive electrode 12 being separated from a negative electrode 13 by an insulating element. The electrodes are disposed perpendicularly to the extrudate's axis of displacement, thereby subjecting the polymer to a longitudinal electric field, a field whose direction is parallel to the direction in which the extrudate is displaced.

Figure 12:
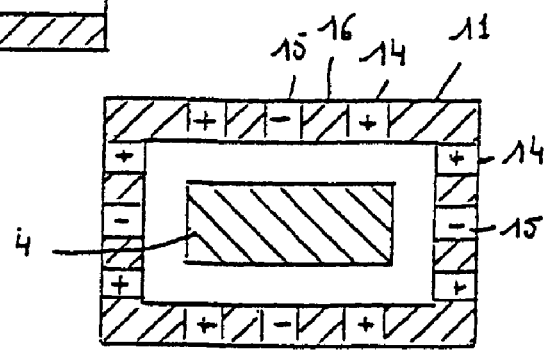

FIG. 12 is a partly sectional view showing a die whose envelope 11 has a series of distinct elements 14, 15 forming positive electrodes and negative electrodes, one positive electrode 14 being separated from a negative electrode 15 by an insulating element 16. The electrodes are positioned relative to one another so as to define transverse electric fields, the direction of which is perpendicular to the direction in which the extrudate is displaced.

It goes without saying that it is possible to create electric fields that are constituted by operatively associating a radial electric field, a longitudinal electric field and/or a transverse electric field, by positioning the electrodes in an appropriate manner. If, for example, the mandrel rod is a negative electrode, radial and oblique electric fields will be created in the devices shown in FIGS. 11 and 12, in addition to the longitudinal or transverse fields.

Figure 13:
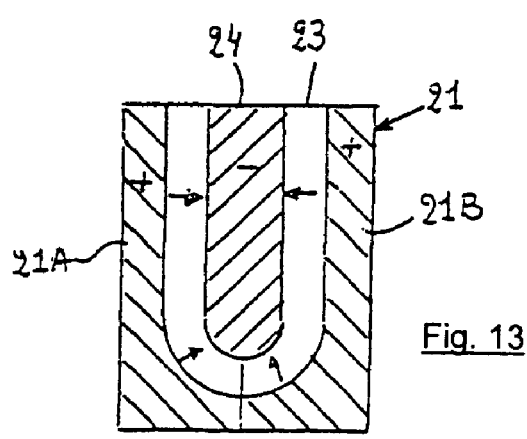
FIG. 13 is a schematic view of a mould according to the invention.

FIG. 13 represents a mould 20 constituted by an outer envelope 21 comprising two parts 21A, 21B which may be separated from one another so as to enable the molded part to be withdrawn. A cavity 23 is defined within said envelope 21. Into this cavity 23 extends a core, for example a cylindrical core 24, said core being fixed on the injection machine. The mould is advantageously equipped with cooling means. The envelope 21 for example constitutes a positive electrode, while the core 24 constitutes a negative electrode, or vice versa.

Figure 14:
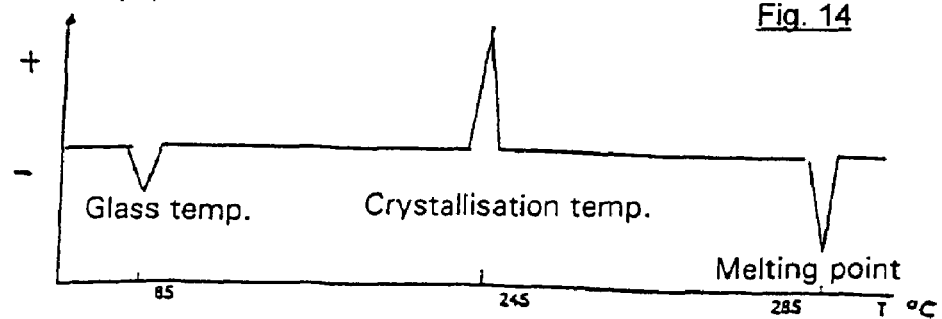
FIG. 14 represents the enthalpy curve of the PET obtained by the DSC (differential scanning calorimetry) method.

FIG. 14 represents a PET enthalpy curve, said curve depicting a (hollow) glass transition peak corresponding to the PET glass transition temperature, a crystallization peak corresponding to the PET crystallization temperature, and a (hollow) melting peak corresponding to the PET melting point.

In order to raise the dielectric constant of the PET it may be useful to add additives that possess dielectric properties to the crystalline or semi-crystalline polymer. Such additives will be familiar to anyone skilled in the art. In particular, barium titanate and/or $TiO_2$ will be used, in the form of powder or fine flakes. For example, the quantity of additive(s) possessing dielectric properties will be between 0.01 and 25%, advantageously between 0.1 and 10% by weight of the crystalline or semi-crystalline polymer, and in particular with respect to the weight of PET polymer.

Figure 15:
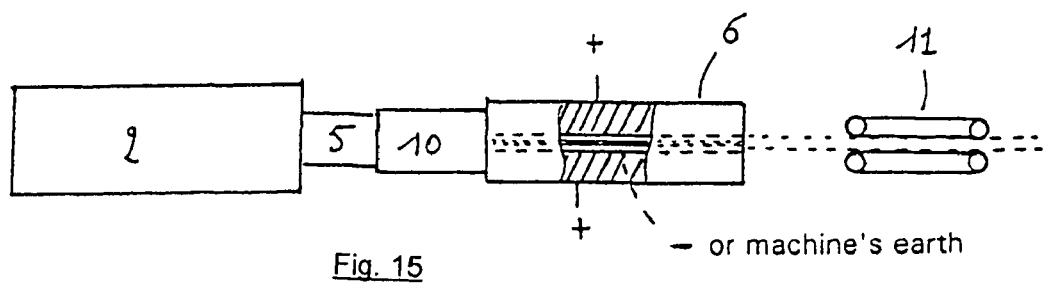
FIGS. 15 to 17 are schematic views of specific embodiments of the device according to the invention.

FIG. 15 is a view showing a device according to the invention that is similar to the one in FIG. 1. This device features:
  an extruder 2;
  an adiabatic zone 5;
  a die 10;
  a shaping fixture 6; and
  a traction system 11 which draws the product 7 outside of the shaping fixture.

In the embodiment seen in FIG. 15, the shaping fixture 6 is equipped with means for applying a radial static electric field. The product obtained exhibited mechanical characteristics improved by 30% compared to the product obtained when no electric field was applied. In the embodiment seen in FIG. 16, the device is similar to that in FIG. 15, except for the fact that there is no adiabatic zone 5 (the product exiting from the extruder passes straight into the die 10) and that a static electric field is applied to the material passing into the die 10 instead of into the shaping fixture 6. The electric field is advantageously radial. It was observed that by applying a radial electric field in the die, a lesser extruder pressure was sufficient to ensure the same throughput of extruded product as when no electric field was applied. In the case of crystalline polymer, it was observed that the extruder pressure could be reduced by a factor of 5 to 10 when a radial electric field of at least 5,000,000 volts/m was applied, while maintaining the same throughput as an extruder operatively associated with a die in respect of which no electric field is applied.

By applying such an electric field in the die it is therefore possible to raise the throughput of extruded material by utilizing the extrusion pressure employed in the case where no electric field is applied to the die. By controlling the force of the radial electric field and/or by controlling the pressure of the extruder it is therefore possible to control the throughput of extruded material.

Figure 16:
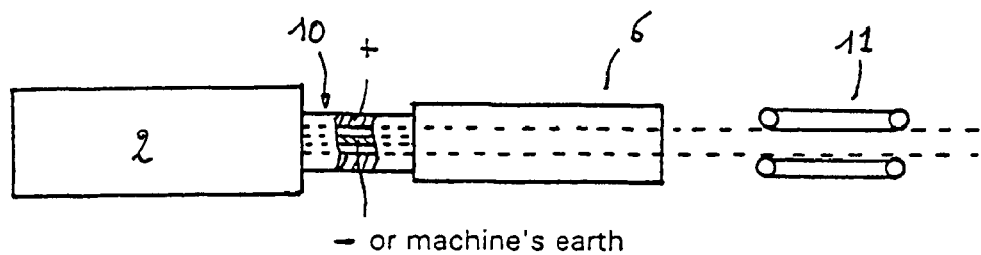
Figure 17:
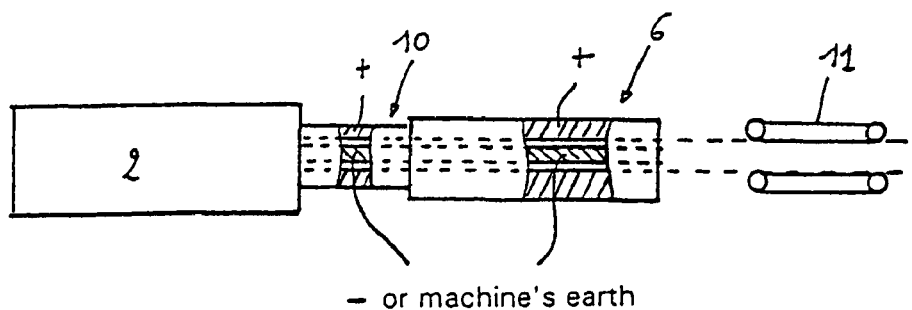

Finally, the device seen in FIG. 17 is similar to the one in. FIG. 16, except for the fact that a radial electrical field is applied to the shaping fixture 6. This device makes it possible on the one hand to increase the production of an existing extruder and on the other hand to improve the mechanical characteristics of the extruded product.

Figure 18:
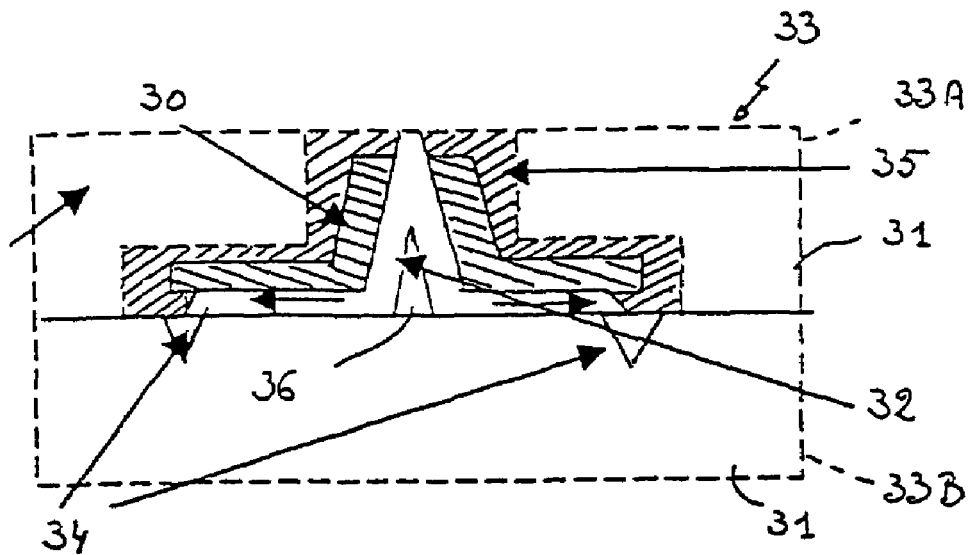
FIG. 18 represents an arrangement of electrodes in an injection runner of a mould.

FIG. 18 schematically shows one possible arrangement of electrodes (positive electrode 30, negative electrode or earth 31) in an injection runner 32 of a mould 33, having for example a fixed part 33A with respect to the head of an injector and a moving part 33B adapted to execute a relative motion with respect to part 33A, in order to enable the moulded article to be removed from the cavity or cavities 34. The injection runner 32 has a finger or means 36 for distributing the polymer flow to the various cavities 34 of the mould or to a plurality of locations in the mould cavity or cavities. The fixed part of the mould presents a positive electrode 30 which is insulated by an insulating layer 35 from the frame 33A1 of part 33A. The frame 33A1 is joined to the injector's earth. The moving part 33B is arranged so as to be connected to the injector's earth, at least when part 33B is resting against part 33A (with the mould in the closed position). The moving part 33B therefore also forms an earth at least when the mould 33 is in the closed position. In the embodiment shown, the finger or means 36 is carried by part 33B. The insulating layer 35 also provides insulation between the positive electrode and the injector head. If the injector head is provided with a positive electrode, the positive electrode of the mould is advantageously connected to the positive electrode of the injector, the positive electrode of the injector then being insulated from the frame 33A1.

During injection, the melted material flows into the injection runners 32, and notably between the positive electrode and the means 36 and one face of part 33B. The material is accordingly subjected to a field perpendicular to the direction in which the material flows in part 33A.

In the case where part 33A is provided with cooling ducts, these ducts will be arranged along the face of the positive electrode that is not in contact with the material being injected, the cooling fluid then being an electrical insulating fluid, more particularly an electrical insulating cooling oil, or a dielectric oil.

Figure 19:
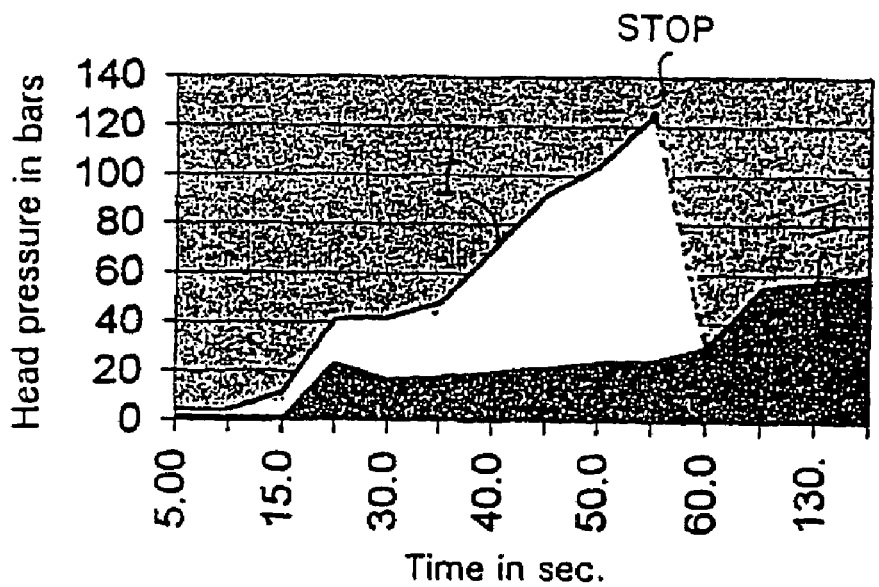
FIG. 19 shows how the pressure required for POM to pass through a forming device evolves over time (where time 0 corresponds to the start time of introducing polymer into the device), with and without applying a radial electric field.

FIG. 19 shows the pressures exerted by the screw of an extruder which is advancing polyoxymethylene (crystalline polymer) into a polarized forming device [radial field applied to the material from the time that the material is introduced into the device (temperature close to melting point) until it leaves the device at a temperature close to the glass transition temperature] and into the unpolarized forming device from the time that the material is introduced at a temperature close to melting point.

It can be seen from this Figure that where the forming device is not polarized (curve I), the flow is in a first adiabatic period (±15 seconds), after which a front or abrupt increase in the pressure is observed (due to the polymer's crystallization peak). Thereafter a pressure increment is observed up to a time of 30 seconds after the introduction of the material. The pressure then continues to rise until the maximum permissible pressure of the forming device and of the extruder is reached (120 bars). Due to the material having cooled, a plug of material has formed in the forming device and a pressure of 120 bars was not enough to force the material out of the forming device.

When it comes to polarizing the forming device (radial electric field of 5,000,000 volts/m applied to the material), just after material enters the forming device a pressure lower than that prevailing when no electric field is applied is observed (curve II), followed by a 20 bar increment up to 60 seconds (time measured from when the material is introduced). Next an abrupt increase in pressure is observed due to the fall in temperature of the material in the forming device, followed by a pressure increment of approx. 60 bars. The shaped material exits from the device at a pressure of around 60 bars.

This Figure therefore shows that by applying an electric field in the forming device it is possible to greatly reduce the maximum pressure that it is necessary to apply in order to force the material to pass through the forming device.

Figure 20:
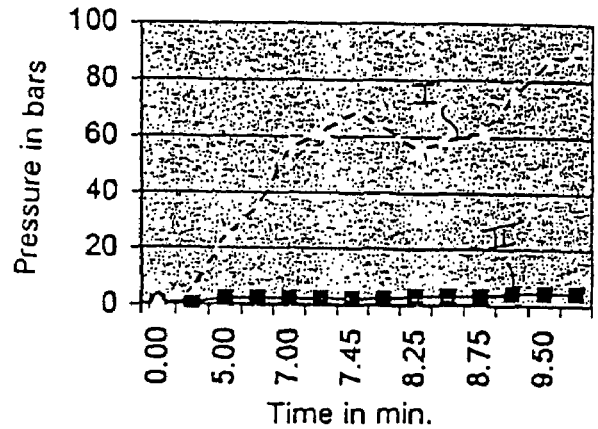
FIGS. 20 to 22 are graphs similar to the one in FIG. 19, except for the fact that the extruded material is respectively PET, high-density PE, and polypropylene.

FIG. 20 is a figure similar to FIG. 19, but showing the effect of an electric field in the forming device for PET. It can be seen from this Figure that by applying an electric field (curve II), the maximum pressure required to pass the material through the device is reduced. Curve I shows the pressure needed when no electric field is applied.

Figure 21:
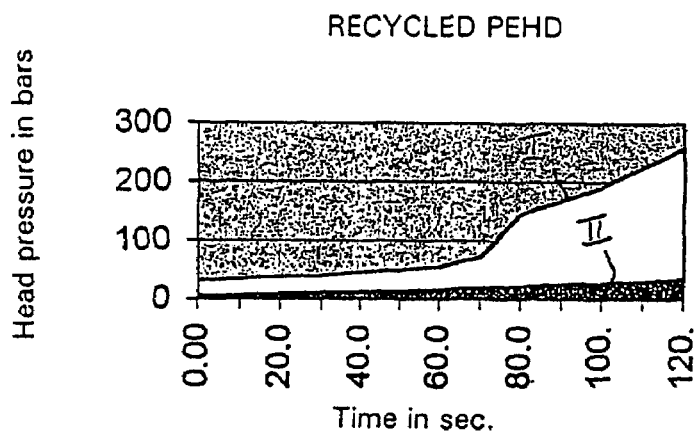
Figure 22:
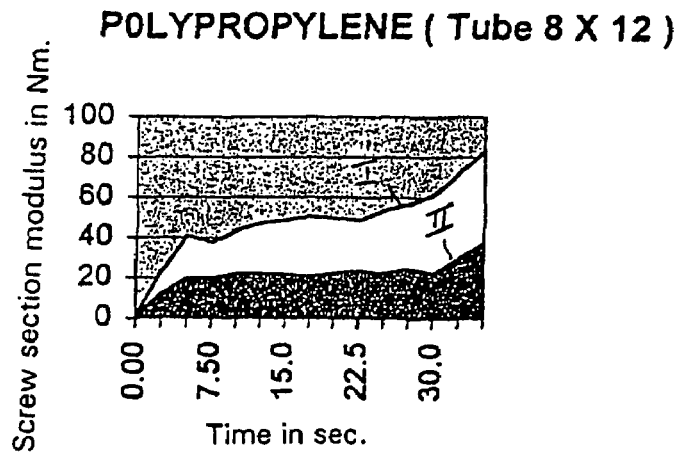

Lastly, FIGS. 21 and 22 are figures similar to FIG. 19, but applied respectively to recycled high-density polyethylene and to polypropylene. This figure also shows that by applying an electric field (in this example radial: curve II) it is possible to reduce the maximum pressure needed to pass material through the forming device. Curve I shows the pressure necessary when no electric field is applied.

Such a reduction in pressure shows that by applying an electric field the friction of the material on one or more walls of the forming device is substantially reduced. This lesser friction makes it possible to either increase production or reduce the wear on the extruder and/or on the forming device, to reduce accidents due to accidental blockages of material in the forming device, etc.

PET, POM and high-density PE test pieces were also prepared by applying a radial electric field of 5,000,000 volts/m in the forming device, together with other test pieces in the forming device without applying an electric field. Accordingly a resistance to traction was observed that was substantially the same for the test pieces with the electric field as for the test pieces without the electric field. However, as far as the modulus of elasticity is concerned, it was observed that the POM and PET test pieces had a modulus of elasticity approximately 60% higher when an electric field was applied than was the case with the modulus of the specimen prepared in the absence of an electric field. In the case where the test pieces prepared with an electric field were post-cured (post-curing carried out for 48 hours at a temperature 20° C. higher than the glass transition temperature), the test pieces prepared using the electric field and post-cured still had a modulus of elasticity approximately 20 to 30% higher than the modulus of elasticity of the test pieces that were not prepared using an electric field and post-cured.

The following Table gives Young's modulus of elasticity (expressed in MPa) for a test piece molded without an electric field (A), a test piece molded without an electric field but with post-curing (B), and a test piece prepared with an electric field.

| Test piece | Modulus MPa | Ratio of modulus test piece X/test piece C |
|---|---|---|
| A | 1297 | 1.61 |
| B | 1725 | 1.33 |
| C | 2088 | 1 |

The method according to the invention may be used to manufacture many different parts, such as molded parts, extruded parts, panels, rails, profiles, sheets, troughs (e.g. cable troughs), profiles with T-sections, profiles with U-sections, profiles with I-sections, profiles with L-sections, profiles with X-sections, etc..

Figure 23:
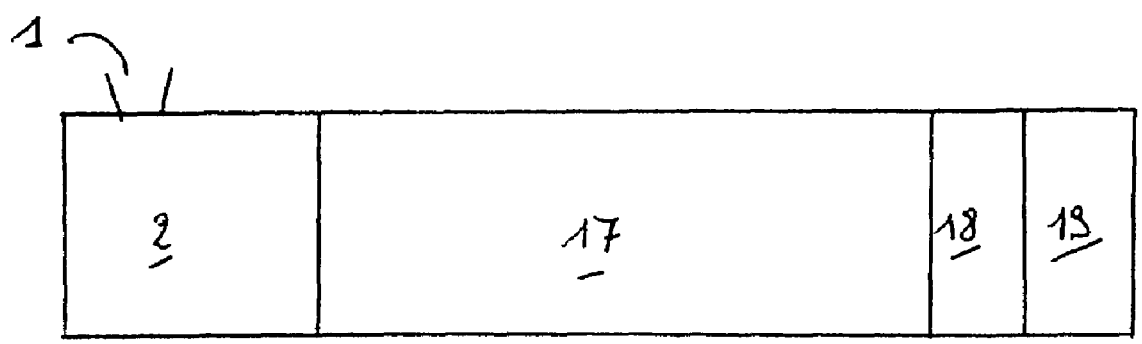
FIG. 23 is a schematic view of a further embodiment of a device of the invention.

FIG. 23 is a schematic view of an embodiment of a device of the invention. In said device, an extruder 2 receives crystalline or semi-crystalline polymer or copolymer with a low crystallization rate (such as a PET with a low crystallization rate) trough the feed hopper 1. The polymer or copolymer is melted in the extruder and is forced into an electrostriction converter 17 in which the temperature of the polymer or copolymer is rapidly reduced below the crystallization temperature. For example, the reduction of the temperature below the crystallization temperature is made in less than 60 seconds, advantageously in less than 30 seconds, preferably in less than 15 seconds, such as in less than 10 seconds, for example in about 8 seconds, 5 seconds, etc.

Due to the rapid cooling of the polymer or copolymer, the polymer or copolymer has no or substantially no crystallites, and can be easily transformed.

The polymer or copolymer escaping the electrostriction converter enters then a mechanical device 18, such as a gear pump or a screw pushing device, for pushing the polymer or copolymer in a die or a shaping device 19. The die or shaping device is advantageously a cold die or cold shaping device, said die or shaping device having a limited length. The gear pump or screwing device is also adapted for limiting the temperature reduction of the polymer or copolymer, whereby the polymer or copolymer enters the die or shaping device 19 at a temperature greater than the glass transition temperature. The polymer or copolymer after its passage in the cold die or shaping device has advantageously a temperature below the glass transition temperature.

For ensuring the rapid cooling of the polymer or copolymer below the crystallization temperature, the converter 17 is shaped so as to ensure a quick cooling, for example a temperature reduction from about 270-290° C. up to 150° C.-170° C. in about 8 seconds for a PET polymer. The electrostriction effect is obtained by submitting the polymer or copolymer to a static electrical field of more than 1,000,000 volt/m, such as a static electric field of 5,000,000 Volt/m. For example, the converter is shaped so that the thickness of the polymer or copolymer (such as a PET polymer) between the positive electrode and the negative electrode or earth is less than 10 mm, advantageously less than 5 mm, preferably equal to about 2.5 mm, or even most preferably lower than 2.5 mm.

For example, when the device of FIG. 23 is used for shaping product with PET, the temperature of the PET at the entry of the converter is about equal to the melting point of the PET or is lower than said melting point, while at the outlet of the converter, the temperature of the PET is within the range of 150-170° C. The PET is then pushed in the cold die or shaping device 19 at a temperature of about 150° C.

I claim:

1. A method for preparing a composition selected from the group consisting of polymer compositions, copolymer compositions and polymer-copolymer compositions from at least two different compounds selected from polymers and copolymers, whereby said compounds have each a melting point,
   in which said at least two compounds are mixed in a melted state, so as to form a melted mixture of said at least two compounds,
   in which said melted mixture of said at least two compounds is flowing through a structure and contacted for a contact time with said structure, wherein said structure is formed by a bed of beads selected from the group consisting of at least partly piezoelectric beads, at least partly electrostrictive beads, at least partly magnetostrictive beads, and combinations thereof, said structure presenting passages for the flow of the melted mixture, whereby said passages have a cross section of less than 2 mm², and
   in which, for at least a portion of said contact time of the melted mixture with said structure, the structure is submitted simultaneously to
   (a) a first field selected from the group consisting of static electrical field higher than 0.5 megavolts/meter, static magnetic field higher than 0.5 Tesla and combinations thereof, and
   (b) a second field selected from the group consisting of pulsed electrical field higher than 0.5 megavolts/meter, pulsed magnetic field higher than 0.5 Tesla and combinations thereof during a period of time at least sufficient for improving at least one characteristic selected from the group consisting of Young modulus, waterproof, gas proof, liquid proof, release rate, impact resistance, aging, and combinations thereof.

2. The method of claim 1, in which the structure has passages for the flow of the melted mixture with a cross section of less than 1 mm².

3. The method of claim 1, in which the structure has passages for the flow of the melted mixture with a cross section of less than 500 µm².

4. The method of claim 1, in which for at least a portion of said contact time of the melted mixture with said structure, the structure is submitted at least to an electrical field selected from the group consisting of static electrical field of 0.5 to 10 megavolts/meter, magnetic electrical field of 0.5 to 10 megavolts/meter, and combinations thereof.

5. The method of claim 1, in which for at least a portion of said contact time of the melted mixture with said structure, the structure is submitted to a magnetic field selected from the group consisting of static magnetic field comprised between 0.5 and 10 Tesla, pulsed magnetic field comprised between 0.5 and 10 Tesla, and combinations thereof.

6. The method of claim 1, in which the melted mixture has a melting point and a degradation temperature higher than said melting point, whereby the melted mixture is pushed to flow in the passages of the structure at a temperature comprised between the melting point and the degradation temperature.

7. The method of claim 1, in which the melted mixture has a melting point and a degradation temperature higher than said melting point, whereby the melted mixture is pushed to flow in the passages of the structure at a temperature comprised between 5° C. and 100° C. above the melting point, with the proviso that said temperature is below the degradation temperature.

8. The method of claim 1, in which at least a portion of the beads of the structure are adapted to be separated from at least a portion of the melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof.

9. The method of claim 1, in which the beads of the structure are adapted to be separated substantially completely from the melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof.

10. The method of claim 1, in which the structure comprises first beads adapted to be separated from the melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof, and second beads adapted to remain in said melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof.

11. The method of claim 10, in which the second beads of the structure have a particle size lower than 10 µm.

12. The method of claim 1, in which the structure comprises first beads adapted to be separated from the melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof, and second beads adapted to remain in said the melted mixture after its contact with the structure submitted simultaneously to
- (a) a first field selected from the group consisting of static electrical field higher than 0.5 megavolts/meter, static magnetic field higher than 0.5 Tesla and combinations thereof, and
- (b) a second field selected from the group consisting of pulsed electrical field higher than 0.5 megavolts/meter, pulsed magnetic field higher than 0.5 Tesla and combinations thereof, said second beads of the structure having a particle size lower than 2 µm.

13. The method of claim 1, in which the melted mixture is contacting the beads of the structure under pressure, whereby for at least a part of the contact time, the pressure is subjected to at least one variation.

14. The method of claim 1, in which the melted mixture comprises at least a first compound selected from polymer and copolymers adapted to be present at least at 25° C. essentially in a first phase intended to form a matrix, and a second compound selected from polymers and copolymers, said second compound different from the first compound being adapted for forming at least at 25° C. essentially a second phase dispersed in the first phase.

15. The method of claim 1, in which the melted mixture comprises at least one liquid crystalline polymer.

16. The method of claim 1, in which the at least two different compounds present in the melted mixture are selected so as enable at least a partial transesterification between said at least two different compounds.

17. The method of claim 1, in which the melted mixture comprises at least a liquid crystalline polymer in an amount adapted to form at least at 25° C. a phase comprising particles with a size lower than 10 µm dispersed in a matrix phase.

18. The method of claim 1, in which the melted mixture comprises at least a liquid crystalline polymer in an amount adapted to form at least at 25° C. a phase comprising particles with a size lower than 1 µm dispersed in a matrix phase.

19. The method of claim 1, in which the mixture is a thermoplastic mixture.

20. The method of claim 1, in which the mixture is suitable to form a thermoplastic matrix.

21. The method of claim 1, in which the melted mixture of said at least two compounds is flowing through a structure and contacted successively with said structure formed by a bed of beads selected from the group consisting of at least partly piezoelectric beads, at least partly electrostrictive beads, at least partly magnetostrictive beads, and combinations thereof, said structure presenting passages for the flow of the melted mixture, whereby said passages have a cross section of less than 2 mm², and
in which, for at least a portion of said contact time of the melted mixture with said structure, the structure is submitted simultaneously to
- (a) a first field selected from the group consisting of static electrical field higher than 0.5 megavolts/meter, static magnetic field higher than 0.5 Tesla, and combinations thereof, and
- (b) a second field selected from the group consisting of pulsed electrical field higher than 0.5 megavolts/meter, pulsed magnetic field higher than 0.5 Tesla and combinations thereof.

22. The method of claim 1, in which the structure comprises beads selected from the group consisting of piezoelectric beads, electrostrictive beads, magnetostrictive beads and combinations thereof, said beads having a diameter comprised between 10 µm and 1000 µm, whereby said beads are placed in a chamber with a volume filling rate comprised between 30% and 70%.

23. The method of claim 1, in which the structure comprises a first fraction of beads selected from the group consisting of piezoelectric beads, electrostrictive beads, magnetostrictive beads and combinations thereof, said beads having a diameter comprised between 10 μm and 1000 μm, and a second fraction of particles selected from the group consisting of piezoelectric beads, eletrostrictive beads, magnetostrictive beads and combinations thereof, said particles having an average weight diameter lower than 1 μm.

24. The method of claim 23, in which the weight ratio first fraction/second fraction is comprised between 1:2 and 50:1.

25. The method of claim 1, in which the mixture of said at least two compounds has at least a melting point and a solidification temperature, whereby the mixture of said at least two compounds after contacting the structure is further processed in a process,
- wherein the thermoplastic material is heated to a temperature higher than the melting point, and
- wherein said heated material is processed in a forming device by lowering therein the temperature of the thermoplastic material from a temperature at least close to the melting point, to a temperature below the solidification temperature, said process comprising a treatment step selected form the group consisting of:
- step of subjecting the thermoplastic material, before its passage in the forming device, to a static electric field between a positive electrode in contact with the thermoplastic material and a reference electrode selected from the group consisting of negative electrode and earth, said reference electrode being in contact with the thermoplastic material;
- step of subjecting the thermoplastic material, during its passage through at least a part of the forming device, to a static electric field between a positive electrode in contact with the thermoplastic material and a reference electrode selected from the group consisting of negative electrode and earth, said reference electrode being in contact with the thermoplastic material; and
- step of subjecting the thermoplastic material, before and during its passage in the forming device, to a static electric field between a positive electrode in contact with the thermoplastic material and a reference electrode selected from the group consisting of negative electrode and earth, said reference electrode being in contact with the thermoplastic material.

* * * * *